(12) United States Patent
Heinrich et al.

(10) Patent No.: US 9,403,602 B1
(45) Date of Patent: Aug. 2, 2016

(54) ARCHITECTURE INDEPENDENT EVENT DRIVEN TRANSPONDERS AND POSITION REPORTING DEVICES

(71) Applicant: Rockwell Collins, Inc., Cedar Rapids, IA (US)

(72) Inventors: Richard E. Heinrich, Marion, IA (US); Ryan J. Paulus, Palo, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 14/275,221

(22) Filed: May 12, 2014

Related U.S. Application Data

(60) Provisional application No. 61/991,220, filed on May 9, 2014.

(51) Int. Cl.
*B64D 45/00* (2006.01)

(52) U.S. Cl.
CPC ........ *B64D 45/00* (2013.01); *B64D 2045/0065* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,351,194 A * | 9/1994 | Ross et al. | ............ | 455/456.3 |
| 5,392,052 A * | 2/1995 | Eberwine | ............ | G01S 19/17 |
| | | | | 342/357.55 |
| 5,719,771 A * | 2/1998 | Buck | ............ | G08G 1/20 |
| | | | | 340/438 |
| 7,131,136 B2 * | 10/2006 | Monroe | ............ | 725/105 |
| 7,620,374 B2 * | 11/2009 | Ziarno et al. | ............ | 455/98 |
| 2004/0090950 A1 * | 5/2004 | Lauber | ............ | H04Q 9/00 |
| | | | | 370/352 |
| 2006/0187026 A1 * | 8/2006 | Kochis | ............ | G06Q 10/08 |
| | | | | 340/539.13 |
| 2008/0039988 A1 * | 2/2008 | Estabrook et al. | ............ | 701/14 |
| 2011/0246002 A1 * | 10/2011 | Shavit | ............ | 701/14 |
| 2012/0191273 A1 * | 7/2012 | Jacobs | ............ | H04B 7/18508 |
| | | | | 701/3 |

* cited by examiner

*Primary Examiner* — Adam Tissot
*Assistant Examiner* — Edward J Pipala
(74) *Attorney, Agent, or Firm* — Angel N. Gerdzhikov; Donna P. Suchy; Daniel M. Barbieri

(57) ABSTRACT

Methods and systems for providing architecture independent event driven vehicle position reporting are disclosed. The position reporting capability in accordance with the present disclosure is provided by a stand-alone, self-contained apparatus operating independently from the rest of the systems onboard a vehicle. This stand-alone, self-contained apparatus is configured to detect a non-nominal or a hostile condition, and automatically starts position reporting and/or tracking. In addition, this stand-alone, self-contained apparatus is configured in a manner so that it cannot be turned off or disabled.

20 Claims, 3 Drawing Sheets

ARCHITECTURE INDEPENDENT EVENT DRIVEN TRANSPONDERS AND POSITION REPORTING DEVICES

CROSS-REFERENCE TO RELATED APPLICATIONS

The present application claims the benefit under 35 U.S.C. §119(e) of U.S. Provisional Application Ser. No. 61/991,220, filed May 9, 2014. Said U.S. Provisional Application Ser. No. 61/991,220 is hereby incorporated by reference in its entirety.

TECHNICAL FIELD

The present disclosure relates generally to position reporting and transponder systems, and more particularly to event driven position reporting and transponder systems.

BACKGROUND

It is important to track positions of vehicles such as aircrafts and the like. However, it is noted that existing position reporting systems available on such vehicles can be turned off or otherwise disabled to prevent transmission of such information.

SUMMARY

The present disclosure is directed to an architecture independent event driven vehicle position reporting system. The system includes an event monitor configured to monitor an operating condition of at least one device located on the vehicle and to detect an occurrence of a triggering event. The system also includes a locator transmitter configured to ping a satellite system when the locator transmitter is activated, wherein the locator transmitter is activated by the event monitor when the occurrence of the triggering event on the device being monitored is detected.

Another embodiment of the present disclosure is also directed to a vehicle position reporting system. The system includes an event monitor configured to monitor an operating condition of at least one device located on the vehicle and to detect an occurrence of a triggering event. The system also includes a dedicated transponder configured to report a position of the vehicle to at least one external equipment when the dedicated transponder is activated, wherein the dedicated transponder is activated by the event monitor when the occurrence of the triggering event on the device being monitored is detected.

A further embodiment of the present disclosure is also directed to a vehicle position reporting system. The system includes an event monitor configured to monitor an operating condition of at least one device located on the vehicle and to detect an occurrence of a triggering event. The system also includes a dedicated transponder configured to report a position of the vehicle to at least one external equipment when the dedicated transponder is activated, wherein the dedicated transponder is activated by the event monitor when the occurrence of the triggering event is detected. The system further includes a dedicated power source configured to maintain operations of the event monitor and the dedicated transponder in an event of power outage.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous objects and advantages of the present invention may be better understood by those skilled in the art by reference to the accompanying figures in which.

DETAILED DESCRIPTION

Reference will now be made in detail to exemplary embodiments of the disclosure, examples of which are illustrated in the accompanying drawings.

Under "nominal" conditions (i.e., when all systems are properly functioning), an aircraft is capable of reporting its position to external devices or locations, such as air traffic controls and the like. However, when the aircraft experiences equipment failures, malfunctioning systems, or intentionally disabled or overridden systems, the aircraft enters into a "non-nominal" state, or the aircraft may be in a "hostile" state if equipment is maliciously disabled/accessed. Under non-nominal or hostile conditions, position reporting capabilities may be lost or intentionally disabled. Depending upon the circumstances, recovery of the aircraft may become very difficult or impossible.

The present disclosure is directed to methods and systems for providing architecture independent event driven vehicle position reporting. The position reporting capability in accordance with the present disclosure is provided by a stand-alone, self-contained apparatus operating independently from the rest of the systems onboard the aircraft (or a given vehicle). This stand-alone, self-contained apparatus is configured to detect a non-nominal or a hostile condition, and automatically starts position reporting and/or tracking. In addition, this stand-alone, self-contained apparatus is configured in a manner so that it cannot be turned off or disabled.

Figure 1:
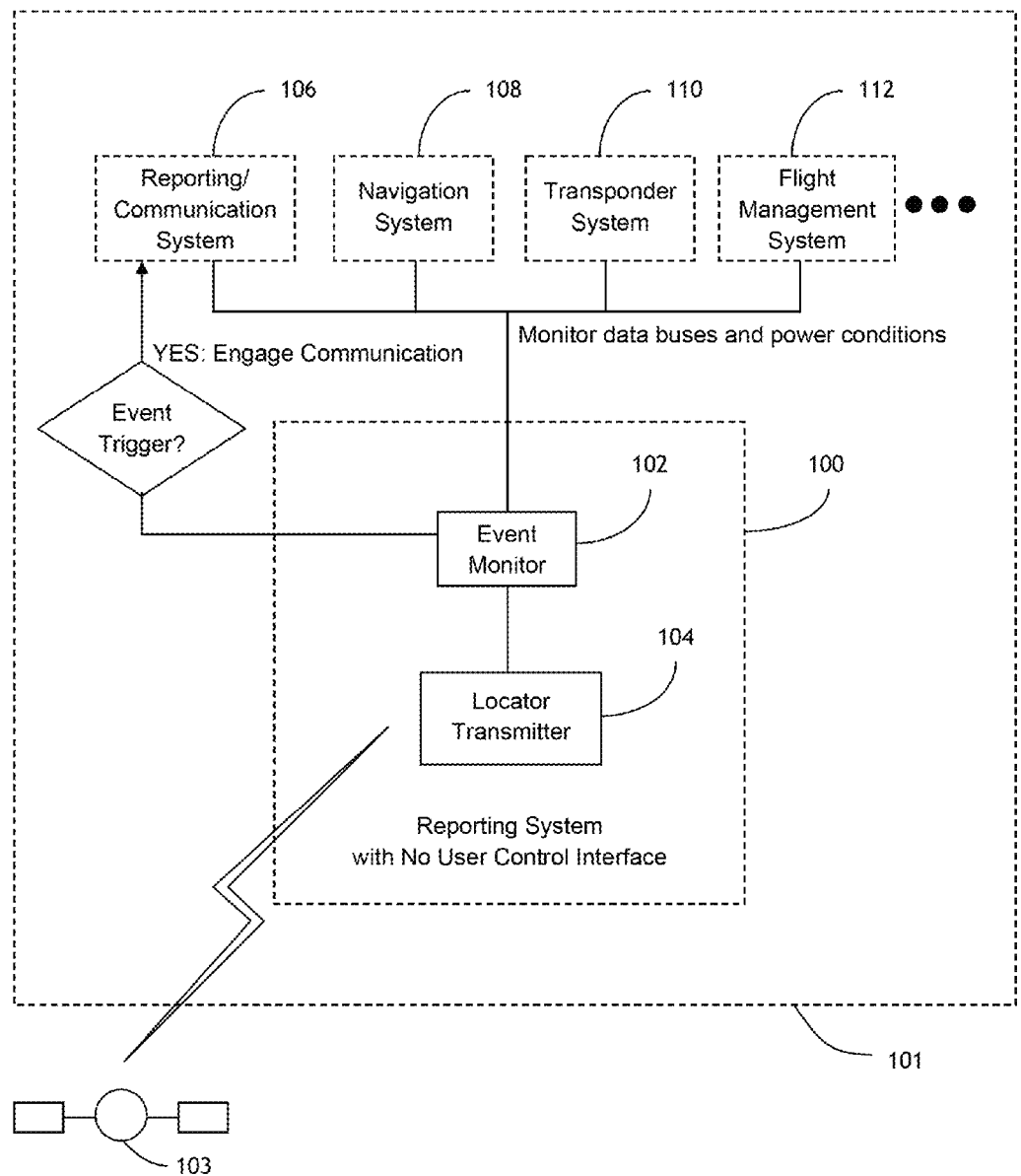
FIG. 1 is a block diagram depicting an architecture independent event driven vehicle position reporting system that includes a locator transmitter.

Referring to FIG. 1, a block diagram depicting an architecture independent event driven vehicle position reporting system 100 is shown. The position reporting system 100 includes an event monitor 102 configured to monitor the operating conditions of one or more other systems/devices onboard the vehicle 101. In the context of aviation, the systems such as the communication system 106, the navigation system 108, the transponder system 110, the flight management system 112, as well as other positioning systems (e.g., GPS), data/voice recording systems and the like, may be some of the systems being monitored by the event monitor 102.

The event monitor 102 may also monitor the data buses on the vehicle 101, power conditions, transponder output, as well as discrete setting for critical systems in order to detect a triggering event. Triggering events in accordance with the present disclosure may include various operating conditions that may suggest one or more systems/devices being monitored is not operating in a nominal manner. For example, if the communication system 106 is experiencing some degree of failure, the communication system 106 may be operating in a non-nominal manner, which can be detected by the event monitor 102. In another example, if a transponder 110 completely fails, becomes unresponsive, or is otherwise disabled, the event monitor 102 may recognize these conditions as a hostile condition. The event monitor 102 may also recognize power outages, fires, as well as various other types of operating conditions outside of the nominal operating conditions. In this manner, when the event monitor 102 detects a non-nominal or a hostile operating condition, it is configured to signal a trigger to automatically start position reporting.

It is understood that other types of detectable events may also be considered as triggering events in addition to the examples provided above. For instance, if a system being monitored by the event monitor 102 is inactive for more than a predetermined amount of time, a triggering event may be signaled. In addition, the event monitor 102 may utilize various types of sensors to monitor the power conditions, cabin/air pressure changes or the like. The event monitor 102 may signal a triggering event if a dramatic change is detected. It is contemplated that additional sensors may also be utilized by the event monitor 102 without departing from the spirit and scope of the present disclosure.

In order to ensure that the vehicle position reporting system 100 is operable in all conditions, including a non-nominal condition, and even more so, during a hostile condition where the rest of the systems have been disabled or sabotaged, a stand-alone transmitting device that functions independently from the rest of the systems is needed. In the embodiment depicted in FIG. 1, an emergency locator transmitter (ELT, also referred to as emergency beacon or locator beacon) 104 is utilized for position reporting/tracking. This emergency locator transmitter 104 is in communication with the detection circuit of the event monitor 102. When the event monitor 102 determines that a triggering event has occurred, the event monitor 102 automatically activates the emergency locator transmitter 104. Upon activation, the emergency locator transmitter 104 starts to ping a satellite system 103 for search and rescue (e.g., SARSAT) detectors.

Figure 2:
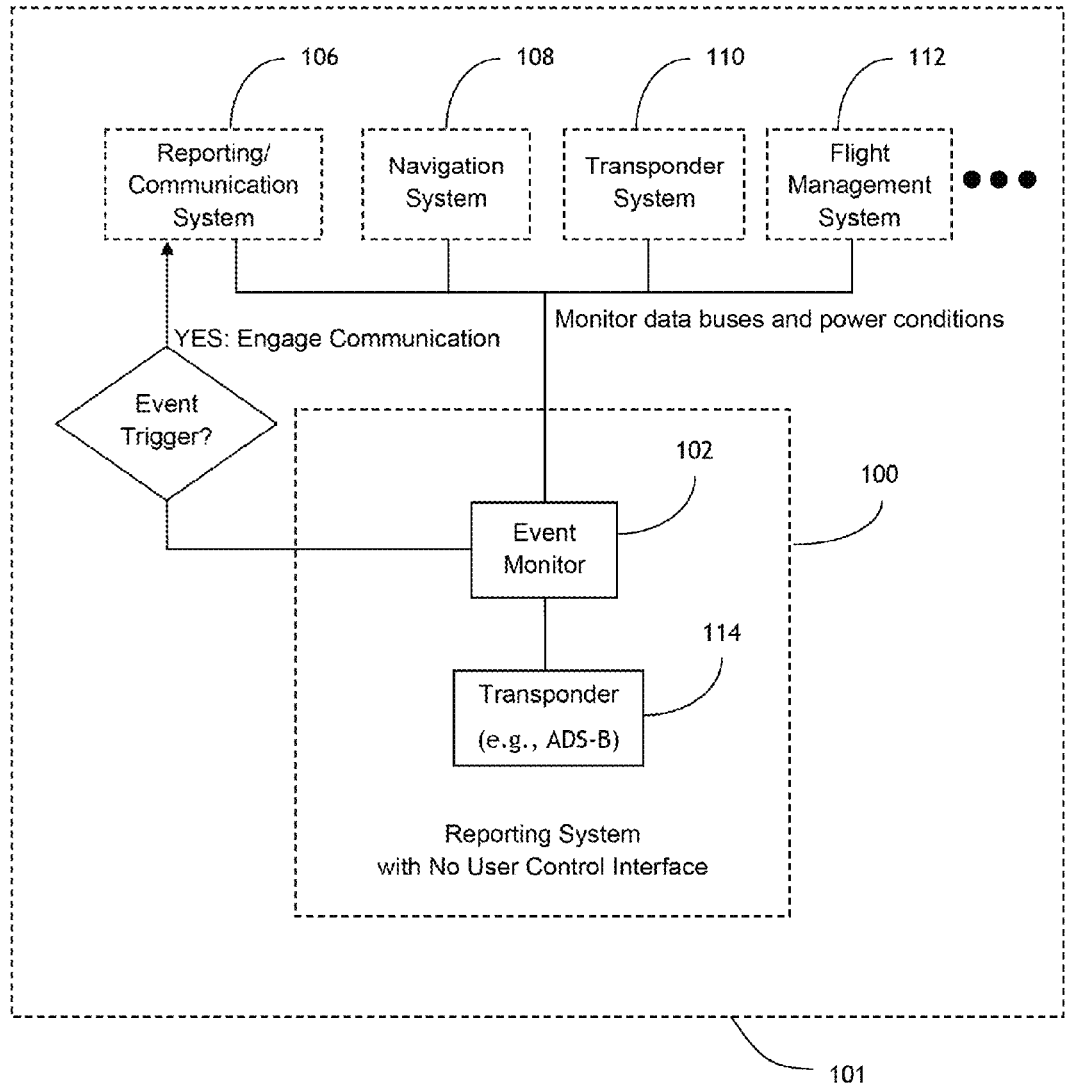
FIG. 2 is a block diagram depicting an architecture independent event driven vehicle position reporting system that includes a dedicated transponder.

In an alternative embodiment depicted in FIG. 2, an automatic dependent surveillance-broadcast (ADS-B) transponder 114 is configured to broadcast position to external equipment such as other aircraft and/or other types of space-based ADS-B sensor systems. It is important to note that this ADS-B transponder 114 is a dedicated transponder solely under control of the event monitor 102. That is, the vehicle position reporting system 100 in accordance with the present disclosure does not share its transponder(s) with any other systems/devices on the vehicle in order to ensure it is operational in non-nominal and/or hostile conditions.

Figure 3:
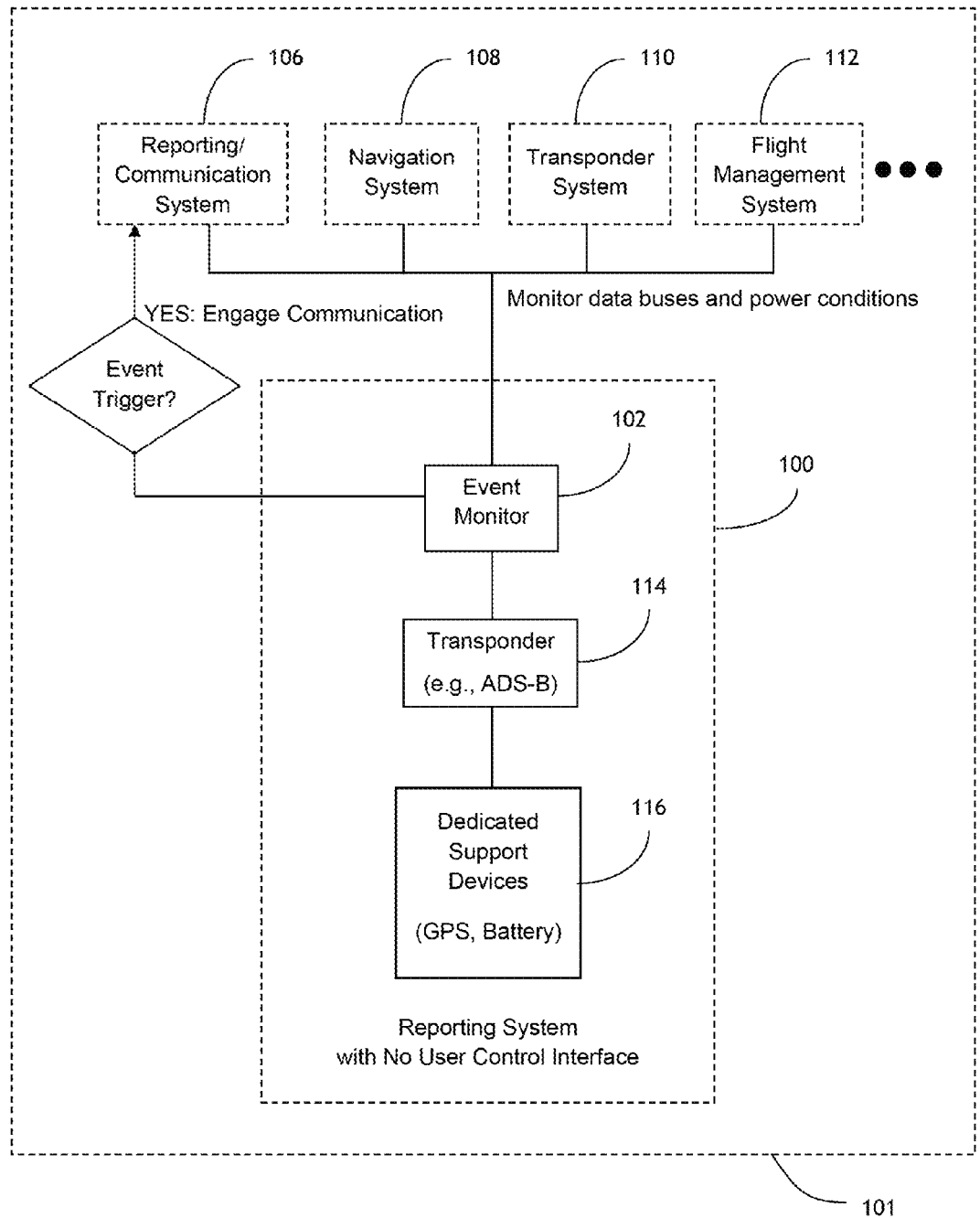
FIG. 3 is a block diagram depicting an architecture independent event driven vehicle position reporting system that includes a dedicated transponder and dedicated support devices.

Referring to FIG. 3, it is contemplated that the vehicle position reporting system 100 may also include one or more dedicated support devices 116. One of the dedicated support devices may include a locator (e.g., a positioning device, a global positioning system or the like). This positioning device does not need to provide the same level of accuracy as the main navigation system 108, but it operates independently and is able to provide position information with sufficient accuracy. The position information may also be obtained from other sensors such as navigation radios or satellite based systems. Another exemplary support device may be an internal power source (e.g., a battery or an emergency power source/generator), allowing the vehicle position reporting system 100 to have power connections from the vehicle as well as an internal source to maintain operation. Providing dedicated support devices as such allows the vehicle position reporting system 100 to be fully self-contained and remain operational even if the rest of the systems onboard the vehicle is unresponsive, turned off or disabled.

It is contemplated that the vehicle position reporting system 100 is configured so that it cannot be turned off or disabled. For instance, no control interface to the vehicle position reporting system 100 is provided on the flight deck or elsewhere that is readily accessible to the pilot. Rather, the vehicle position reporting system 100 is configured to operate in a fully automated, event driven manner that monitors the other systems on a continuous basis and activates position reporting when it detects a triggering event.

It is also contemplated that the vehicle position reporting system described above do not require significant changes to the current architecture of the aircraft and are only intended to provide position information upon detection of certain events. Such a reporting system is minimally invasive, inexpensive, and can be installed on the aircraft in a non-interference manner.

It is contemplated that while the examples above depicted an aircraft as an exemplary vehicle, such a depiction is merely utilized for illustrative purposes. The methods and systems for providing vehicle position reporting in accordance with the present disclosure are applicable to various types of vehicles, including aerial vehicles, maritime vehicles, ground based vehicles and the like. It is also contemplated that the position report referenced in the present disclosure may include various information related to the position data, including, but not limited to, altitude, speed, timing and other related data about the vehicle.

Furthermore, it is understood that while the emergency locator transmitter 104 and/or the transponder 114 are utilized to provide reporting capabilities in the exemplary embodiments described above, other of communication systems onboard the vehicle, if they are still active, may also be triggered to send messages. For instance, the event monitor 102 may be in communication with one or more existing communication systems such as the reporting system 106 onboard the vehicle. If a triggering event is detected, the event monitor 102 may determine if the reporting system 106 is still active, and if so, the event monitor 102 may trigger the reporting system 106 to establish a periodic position report contract with ADS-C.

It is contemplated that other types of communication techniques/devices may also be triggered by the event monitor 102 without departing from the spirit and scope of the present disclosure. For instance, communication techniques/devices described in a co-pending U.S. patent application Ser. No. 14/275,507, entitled "Event Driven Vehicle Position Reporting Methods and Systems", listing Lori J. Sipper et al. as inventors, may also be triggered based on certain detectable events as described above. The entirety of the co-pending U.S. Patent Application entitled "Event Driven Vehicle Position Reporting Methods and Systems" is incorporated herein by reference.

It is to be understood that the present disclosure may be conveniently implemented in forms of a software/firmware/hardware package. Such a software/firmware/hardware package may be a computer program product which employs a computer-readable storage medium including stored computer code which is used to program a computer to perform the disclosed function and process of the present invention. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

It is understood that the present disclosure is not limited to any underlying implementing technology. The present disclosure may be implemented utilizing any combination of software and hardware technology. The present disclosure may be implemented using a variety of technologies without departing from the scope and spirit of the disclosure or without sacrificing all of its material advantages.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

It is believed that the present disclosure and many of its attendant advantages will be understood by the foregoing description, and it will be apparent that various changes may be made in the form, construction, and arrangement of the components thereof without departing from the scope and spirit of the disclosure or without sacrificing all of its material advantages. The form herein before described being merely an explanatory embodiment thereof, it is the intention of the following claims to encompass and include such changes.

What is claimed is:

1. A vehicle position reporting system, comprising:
    an event monitor, the event monitor configured to monitor an operating condition of at least one device located on the vehicle and to detect an occurrence of a triggering event; and
    a locator transmitter, the locator transmitter configured to ping a satellite system when the locator transmitter is activated,
    wherein the locator transmitter is activated by the event monitor when the occurrence of the triggering event is detected, and wherein the event monitor and the locator transmitter are prevented from being disabled by a vehicle operator.

2. The vehicle position reporting system of claim 1, wherein the locator transmitter is an emergency locator transmitter configured to ping a satellite system for search and rescue.

3. The vehicle position reporting system of claim 1, wherein an control interface to the vehicle position reporting system is hidden to prevent user interactions with the vehicle position reporting system.

4. The vehicle position reporting system of claim 1, further comprising:
    a dedicated power source, the dedicated power source configured to maintain operations of the event monitor and the locator transmitter in an event of power outage.

5. The vehicle position reporting system of claim 1, wherein the event monitor is further configured to monitor at least one data bus and a power condition on the vehicle.

6. The vehicle position reporting system of claim 5, wherein the occurrence of the triggering event is detected when at least one of: the device located on the vehicle, the data bus, and the power condition on the vehicle at least partially fails.

7. The vehicle position reporting system of claim 1, wherein the event monitor is further configured to engage an existing communication device onboard the vehicle for position reporting when the occurrence of the triggering event is detected.

8. A vehicle position reporting system, comprising:
    an event monitor, the event monitor configured to monitor an operating condition of at least one device located on the vehicle and to detect an occurrence of a triggering event; and
    a dedicated transponder, the dedicated transponder configured to report a position of the vehicle to at least one external equipment when the dedicated transponder is activated,
    wherein the dedicated transponder is activated by the event monitor when the occurrence of the triggering event is detected, and wherein the event monitor and the dedicated transponder are prevented from being disabled by a vehicle operator.

9. The vehicle position reporting system of claim 8, wherein the dedicated transponder is an automatic dependent surveillance-broadcast (ADS-B) transponder.

10. The vehicle position reporting system of claim 8, wherein an control interface to the vehicle position reporting system is hidden to prevent user interactions with the vehicle position reporting system.

11. The vehicle position reporting system of claim 8, further comprising:
    a dedicated power source, the dedicated power source configured to maintain operations of the event monitor and the dedicated transponder in an event of power outage.

12. The vehicle position reporting system of claim 8, further comprising:
    a dedicated positioning device, the dedicated positioning device configured to provide the position of the vehicle to the dedicated transponder.

13. The vehicle position reporting system of claim 8, wherein the event monitor is further configured to monitor at least one data bus and a power condition on the vehicle.

14. The vehicle position reporting system of claim 8, wherein the event monitor is further configured to engage an existing communication device onboard the vehicle for position reporting when the occurrence of the triggering event is detected.

15. A vehicle position reporting system, comprising:
    an event monitor, the event monitor configured to monitor an operating condition of at least one device located on the vehicle and to detect an occurrence of a triggering event;
    a dedicated transponder, the dedicated transponder configured to report a position of the vehicle to at least one external equipment when the dedicated transponder is activated, wherein the dedicated transponder is activated by the event monitor when the occurrence of the triggering event is detected, and wherein the event monitor and the dedicated transponder are prevented from being disabled by a vehicle operator; and
    a dedicated power source, the dedicated power source configured to maintain operations of the event monitor and the dedicated transponder in an event of power outage.

16. The vehicle position reporting system of claim 15, wherein the dedicated transponder is an automatic dependent surveillance-broadcast (ADS-B) transponder.

17. The vehicle position reporting system of claim 15, wherein an control interface to the vehicle position reporting system is hidden to prevent user interactions with the vehicle position reporting system.

18. The vehicle position reporting system of claim 15, further comprising:
    a dedicated positioning device, the dedicated positioning device configured to provide the position of the vehicle to the dedicated transponder.

19. The vehicle position reporting system of claim 15, wherein the event monitor is further configured to monitor at least one data bus and a power condition on the vehicle.

20. The vehicle position reporting system of claim 15, wherein the event monitor is further configured to engage an existing communication device onboard the vehicle for position reporting when the occurrence of the triggering event is detected.

\* \* \* \* \*